Dec. 27, 1966  B. A. BODENHEIMER ETAL  3,294,034
CARGO CONTAINER FOR AIRPLANES
Filed June 18, 1964  8 Sheets-Sheet 1

INVENTORS.
BERT A. BODENHEIMER
JOHN DIOGUARDI

ATTORNEY.

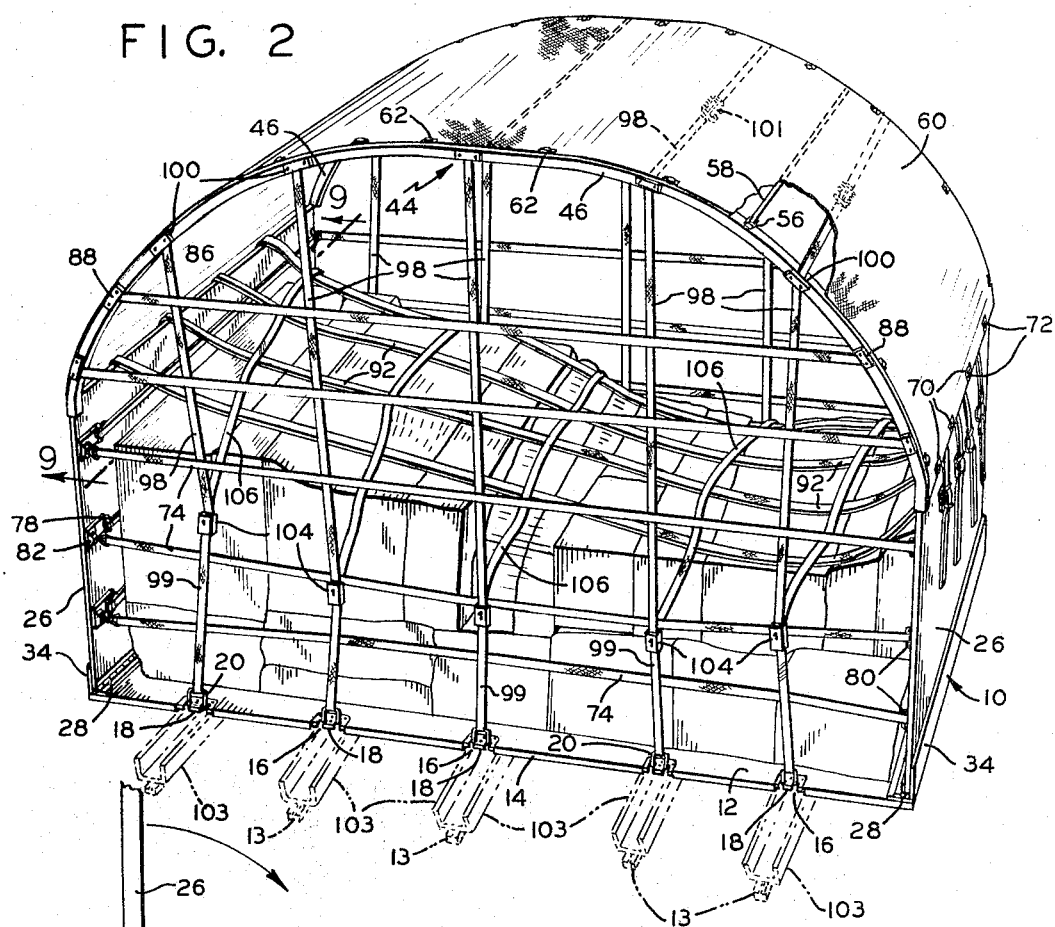
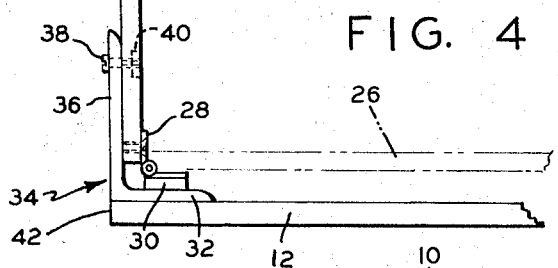
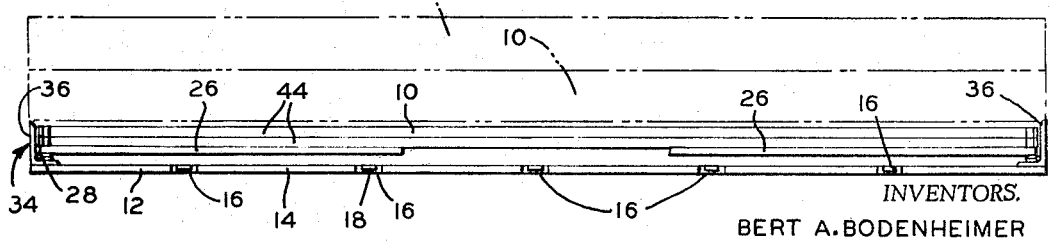

Dec. 27, 1966   B. A. BODENHEIMER ETAL   3,294,034
CARGO CONTAINER FOR AIRPLANES
Filed June 18, 1964   8 Sheets-Sheet 3
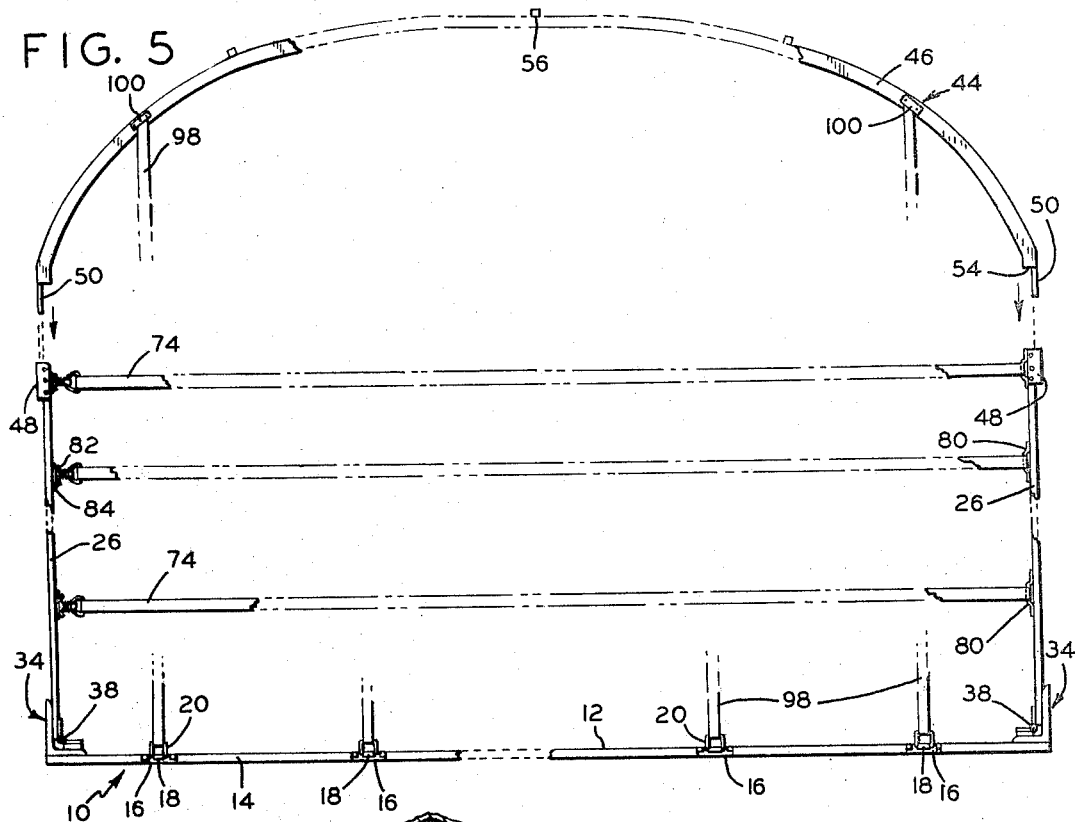
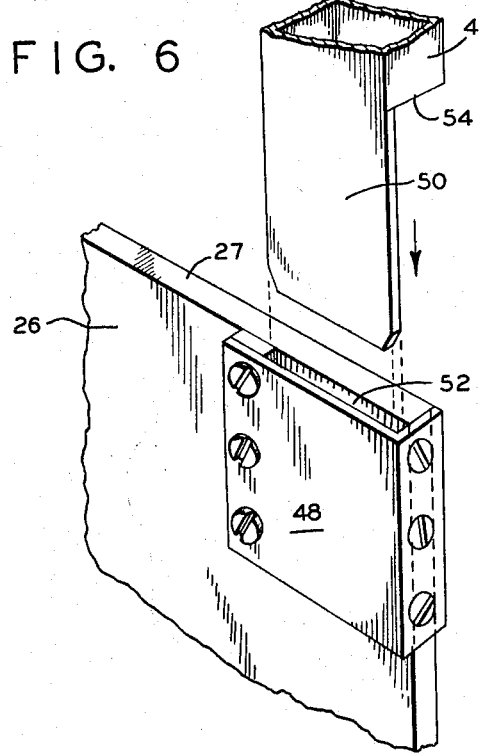
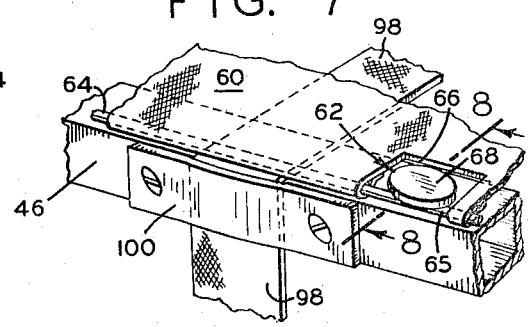
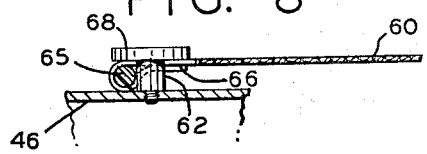
INVENTORS.
BERT A. BODENHEIMER
JOHN DIOGUARDI
BY
ATTORNEY.

Dec. 27, 1966   B. A. BODENHEIMER ETAL   3,294,034
CARGO CONTAINER FOR AIRPLANES
Filed June 18, 1964   8 Sheets-Sheet 4
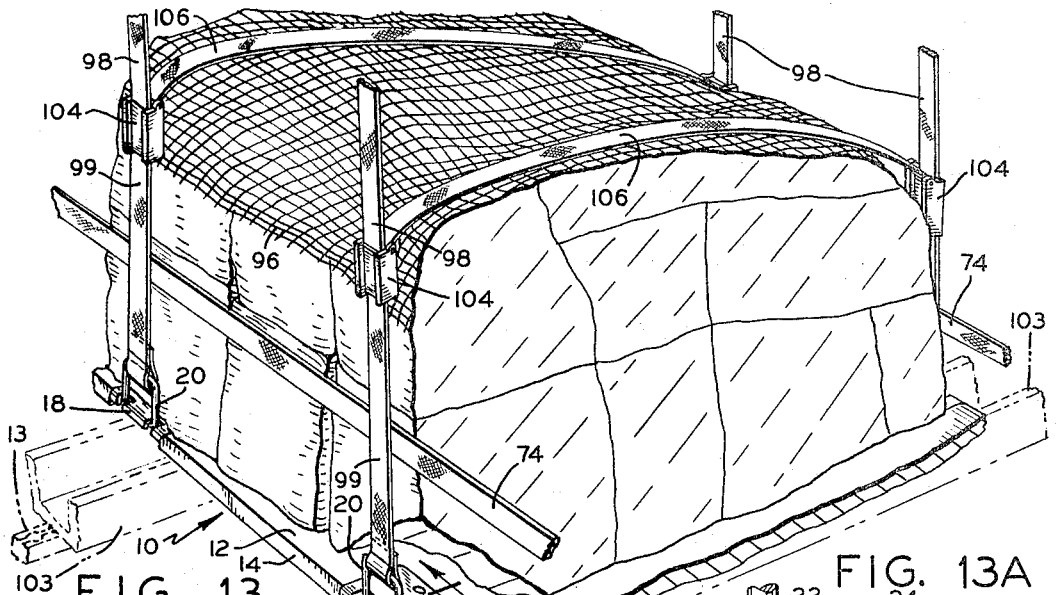
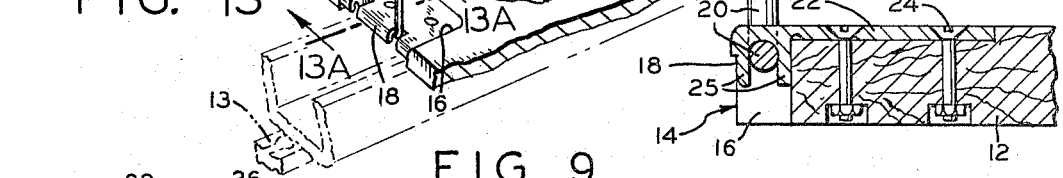
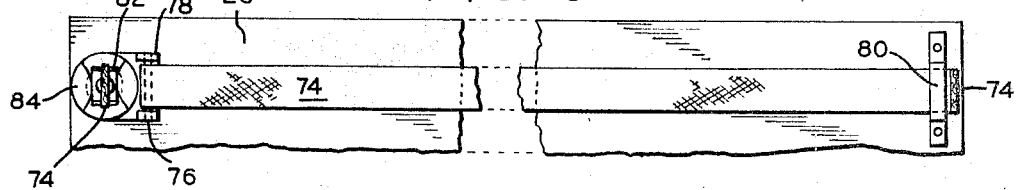
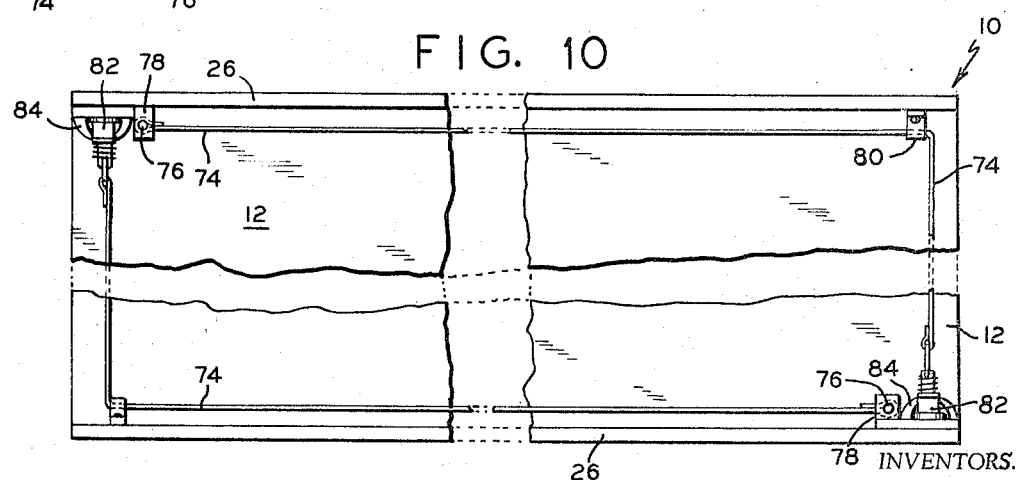
INVENTORS.
BERT A. BODENHEIMER
JOHN DIOGUARDI
BY
ATTORNEY.

Dec. 27, 1966   B. A. BODENHEIMER ET AL   3,294,034
CARGO CONTAINER FOR AIRPLANES

Filed June 18, 1964   8 Sheets-Sheet 5

INVENTORS,
BERT A. BODENHEIMER
JOHN DIOGUARDI
BY
ATTORNEY.

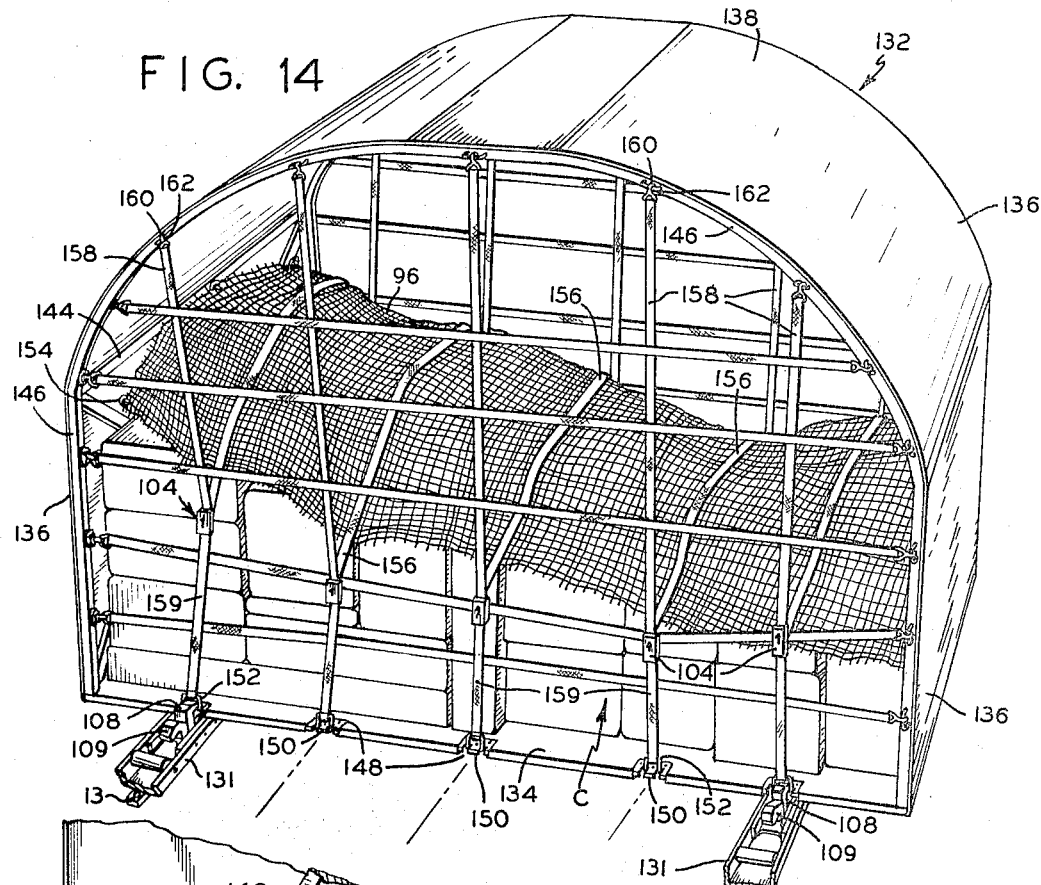
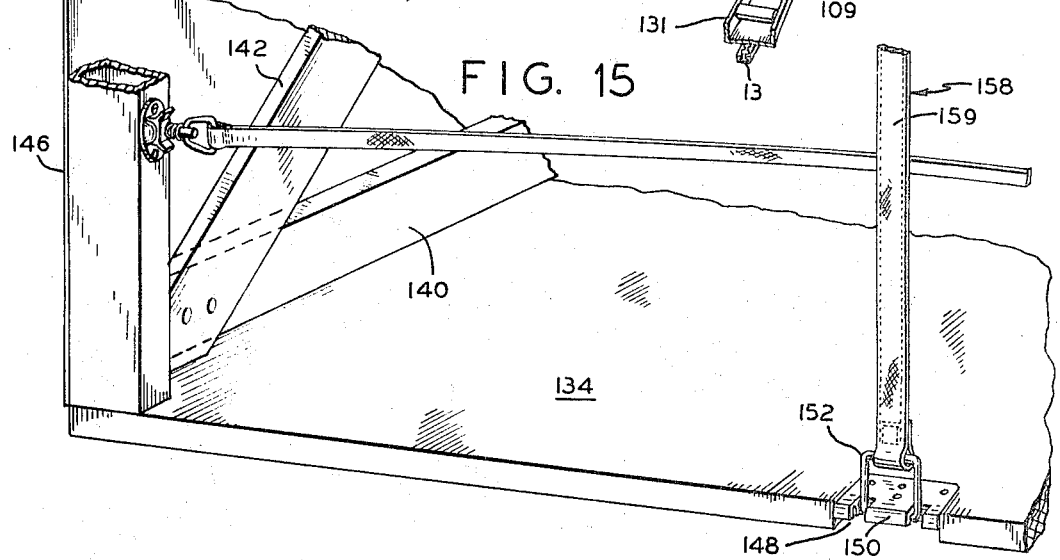

Dec. 27, 1966     B. A. BODENHEIMER ET AL     3,294,034
CARGO CONTAINER FOR AIRPLANES

Filed June 18, 1964     8 Sheets-Sheet 7

INVENTORS.
BERT A. BODENHEIMER
JOHN DIOGUARDI
BY
ATTORNEY.

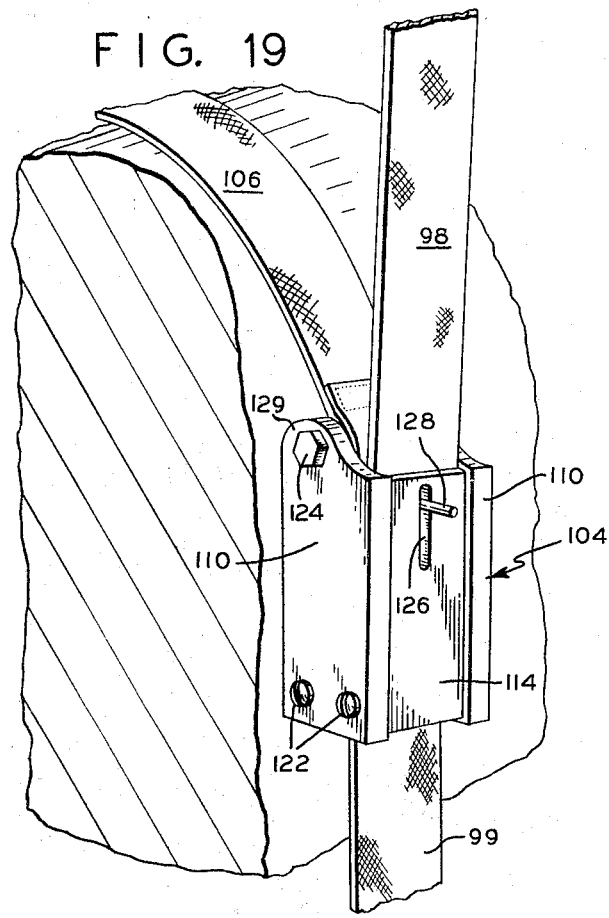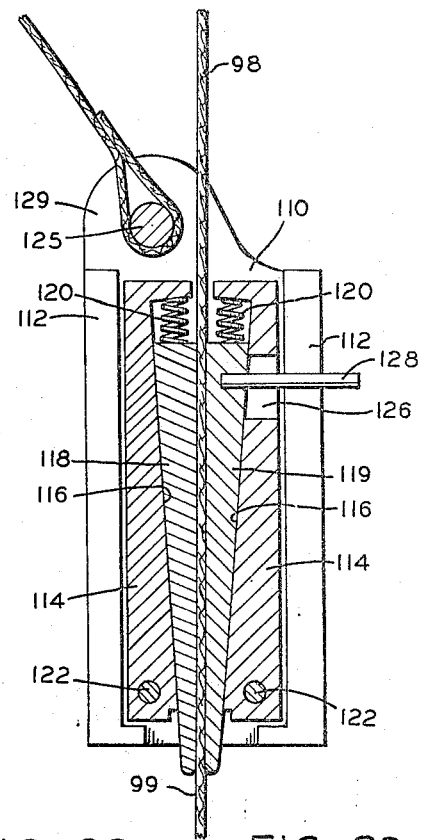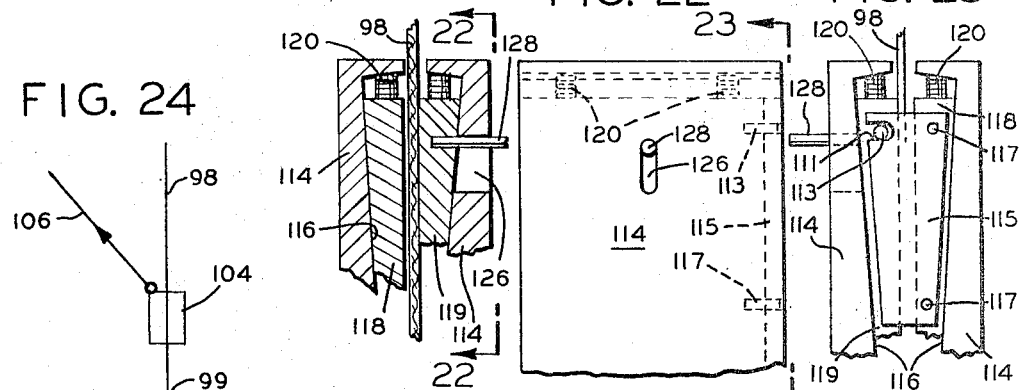

United States Patent Office 3,294,034
Patented Dec. 27, 1966

3,294,034
CARGO CONTAINER FOR AIRPLANES
Bert A. Bodenheimer, Stamford, Conn., and John Dioguardi, Jackson Heights, N.Y., assignors to American Machine & Foundry Company, a corporation of New Jersey
Filed June 18, 1964, Ser. No. 376,196
11 Claims. (Cl. 105—366)

This invention relates to cargo handling apparatus and more particularly to apparatus for handling freight in unitized cargo systems, such as air transportation.

In modern freight handling it has become increasingly necessary to simplify the build-up, transportation and restraint tie-down of loads, in units or predetermined grouping or arrangement of the cargo. In this manner cargo can be handled expeditiously with minimum cost to the shipper and consignee. At the present time pilferage poses a severe problem. However, in accordance with the invention, cargo can be assembled in modular or unitized arrangement and sealed against depredation, and also protected against adverse environment.

Apparatus embodying the invention is readily adaptable for use in transportation by many types of vehicles, such as trucks and railroad freight cars. However, as shown and described herein it is used in connection with air transportation or in aircraft.

Heretofore, cargo to be transported by military and commercial aircraft has usually been placed on relatively flat pallets and secured thereon by suitable devices, such as a net covering the entire load, the ends of which net are attached to the pallet. The placement of a loose net of large size is a time consuming and often quite difficult task. This is due to the net becoming tangled, difficulty in handling because of size and the prime necessity of its adjustment over and about loads of varying heights supported on a pallet.

In addition to the above, cargo on a pallet must be so placed and arranged that the contour of each load conforms to the shape of the interior of the transporting aircraft. Otherwise the netted load of cargo might not fit the shape of the carrying vehicle. Under such conditions much time and energy would be lost and expense involved in reworking and reloading a pallet so that its load would conform with the shape of the aircraft. While load shaping templates have been used in the past, they are heavy, bulky and are non-airborne equipment which, therefore, may not be available for use when required.

The present invention overcomes the disadvantages mentioned above in the practical and expeditious handling of cargo, and especially unitized freight. In accordance with the invention, all load shaping and load restraining requirements are taken care of by the provision of a single load assembling, supporting and transportable unit of novel design and construction.

A unit embodying the invention comprises a base generally similar in construction to a pallet having adequate tie-down provisions for use with a cargo handling apparatus, such for example as disclosed in co-pending Davidson application Serial No. 296,177, filed July 19, 1963. The base supports a relatively light weight structure conforming to the cross-sectional shape of the transporting vehicle i.e., aircraft. The construction is such that it constitutes a container of a size and shape to be readily moved into and out of the aircraft without any difficulty and one which can be secured therein and restrained against appreciable movement under the most severe conditions of travel up to and including crash conditions involving forces equal to at least nine (9) g's. It will be apparent that the shape of the container, and more particularly the cross sectional shape thereof controls the final shaped arrangement and loading of the cargo on the base of the container. This cross-sectional shape or design can be varied in accordance with the particular aircraft in which the loaded container is to be transported. The container is provided with vertical straps which are releasably secured to the base by holding means, such as rings. These rings are also detachably secured to the floor of the aircraft so that forces exerted by the loads on each base of each container are applied directly to the floor structure of the aircraft, and not to the base of a container. Each vertical strap supports a slidable buckle to which is attached one end of a strap which extends on opposite sides of a container i.e., from front to back thereof. These straps, together with that portion of each vertical strap below a buckle constitute the main fore and aft restraint for a unit or container. That portion of each vertical strap above a slidable buckle attached to the upper framework of a container functions to give stability to the load. A plurality of horizontal vertically spaced straps coact with the vertical straps to secure cargo against spilling out between the vertical straps.

It is an object of the invention to provide a novel cargo container having means for securing cargo against breakaway during the most severe transportation conditions to which a vehicle in transit is subjected.

The invention comprises novel cargo handling apparatus wherein loads are secured on a base by means of straps of variable length arranged to be selectively secured about the cargo in accordance with variations in linear measurements of the cargo.

It is a further object of the invention to provide a novel cargo container having a system of straps carried by the container, and wherein certain of the straps which constitute the chief fore and aft restraint of cargo on the base can be varied in operative load restraining length in accordance with the height of the cargo at spaced intervals extending across the top of the cargo. The invention further includes the use of novel top movement constraining means extending across the top of the cargo within the container, the ends of which means are anchored to the container. It also includes the provision of vertically spaced straps arranged angularly relatively to the vertical straps to prevent portions of the cargo from sliding off the base between the vertical straps.

It is a further object of the invention to provide novel cargo restraining means for restraining cargo on a pallet-like base from movement wherein vertical straps support slidable, readily securable locking means having straps attached thereto, and wherein the length of vertical strap below each buckle and the straps attached to the buckles and slidable means constitute a variable cargo restrain-system which is adjustable in accordance with the height and extent of cargo between the vertical straps on which the buckles slide.

With these and other objects not specifically mentioned in view, the invention consists in certain combinations and constructions which will be fully described hereinafter, and then set forth in the claims hereunto appended.

In the accompanying drawings which form a part of this specification, and in which like characters of reference indicate the same or like parts:

FIGURE 2 is another perspective view of the collapsible container of FIGURE 1 with cover in place.

FIGURE 3 is an end elevational view of the container in collapsed position.

FIGURE 4 is an enlarged end elevational view of one corner showing the hinge detail.

FIGURE 5 is an end elevational view showing the top frame removed and the horizontal strap arrangement.

FIGURE 6 is an enlarged perspective view of one corner showing the detail of the socket which receives the top frame.

FIGURE 7 is an enlarged perspective view of a vertical strap detail and cover attachment detail.

FIGURE 8 is a sectional elevational view taken along line 8—8 of FIGURE 7.

FIGURE 9 is an elevational view taken along line 9—9 of FIGURE 2 showing the horizontal strap detail.

FIGURE 10 is a plan view showing a preferred form of horizontal strap arrangement.

FIGURE 13 is a partial perspective view of the loaded container showing cargo restraint.

FIGURE 13-A is a sectional view of line 13a—13a in FIGURE 13.

FIGURE 14 is a perspective view of a non-collapsible, solid top, modified container.

FIGURE 15 is an enlarged perspective view of a corner of the container of FIGURE 14 showing structural detail.

Figure 16:
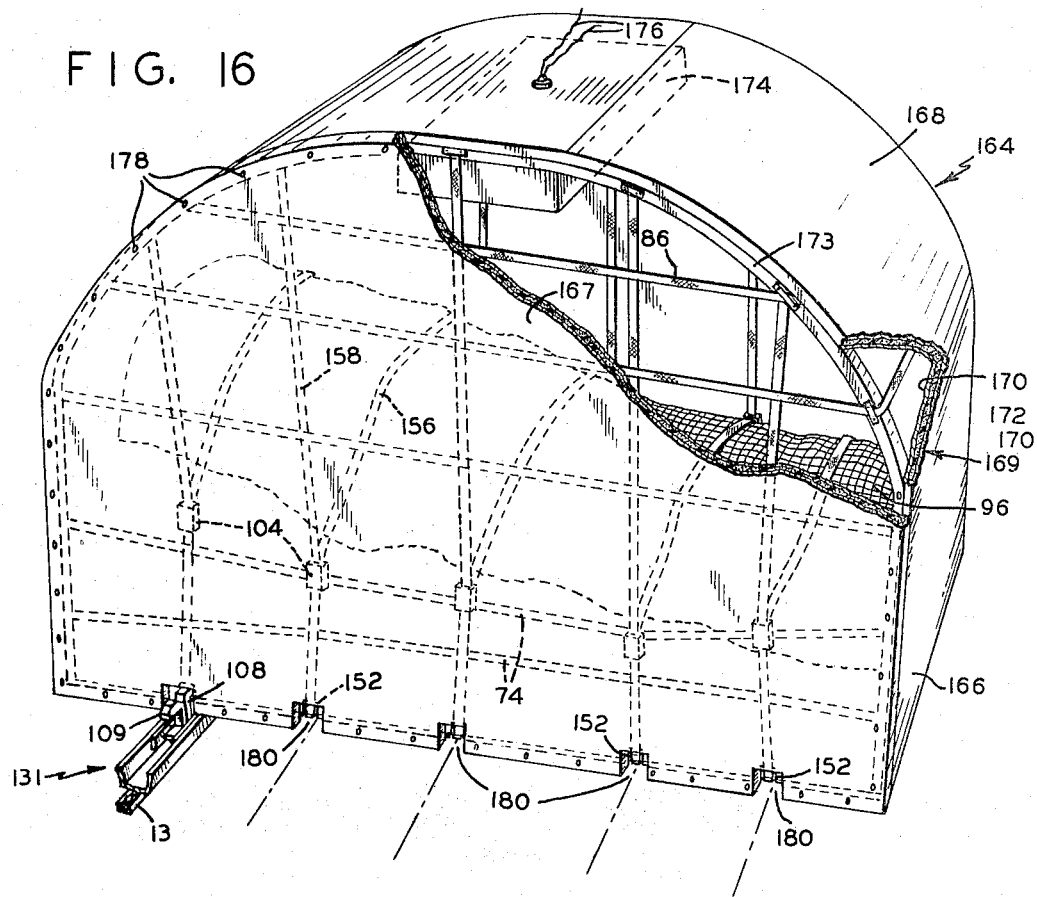

FIGURE 16 is a perspective view of another modification of the present invention including a refrigeration unit and insulating structure.

Figure 17:
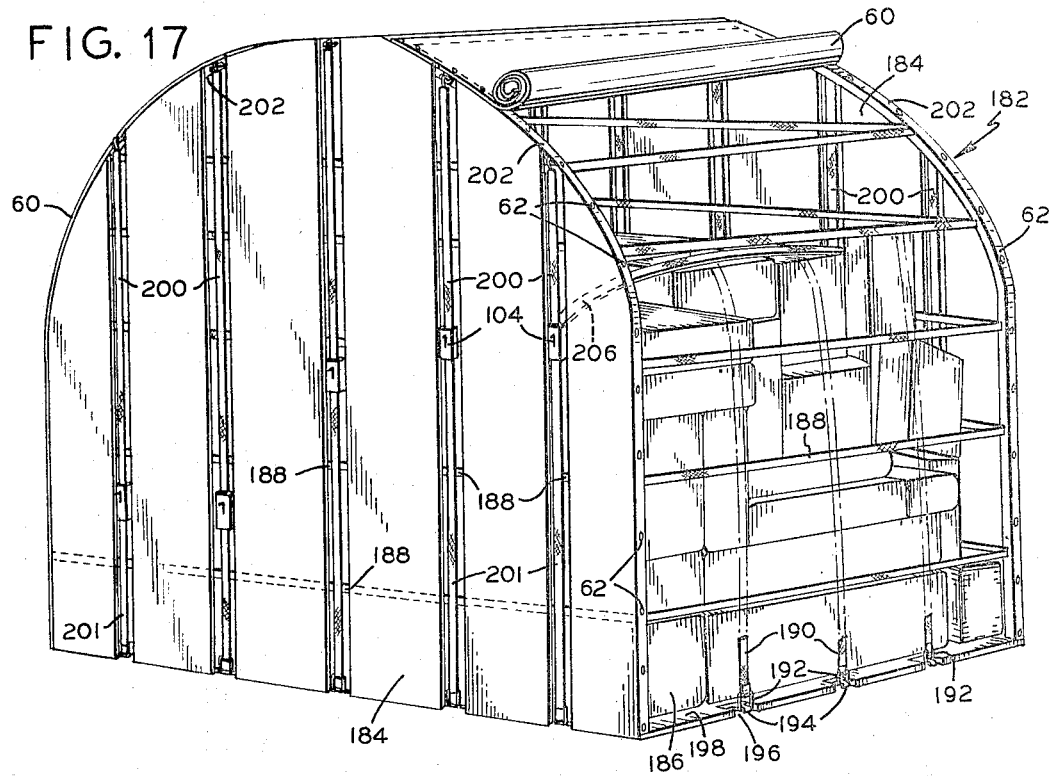

FIGURE 17 is a perspective view of still another modification permitting side loading of the container.

Figure 18:
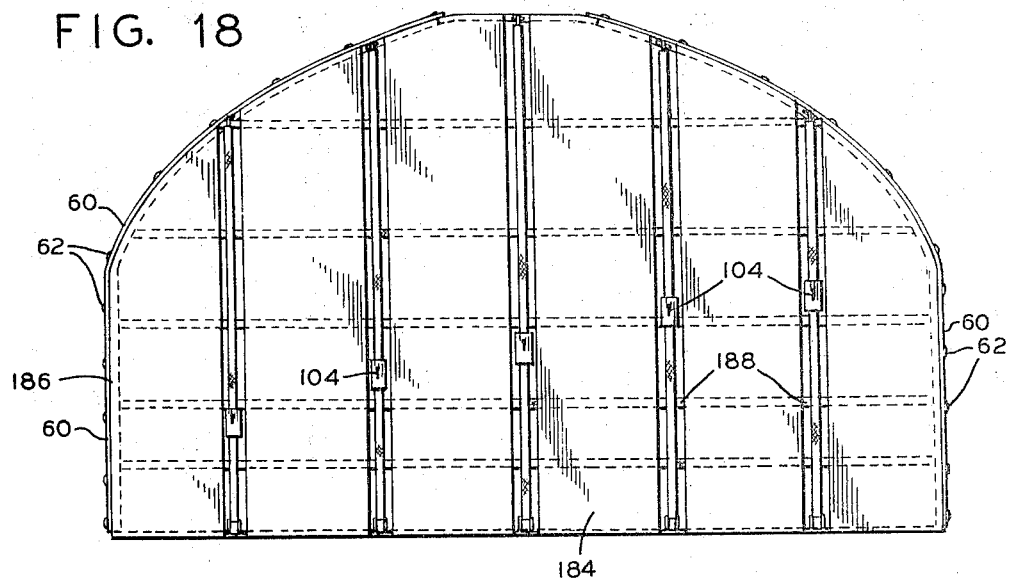

FIGURE 18 is an end elevational view of the container of FIGURE 17.

FIGURE 19 is a perspective view of a suitable buckle used in connection with the container straps.

FIGURE 20 is a sectional view of the buckle of FIGURE 19 taken substantially along the centerline.

FIGURE 21 is a fragmentary sectional view similar to FIGURE 20 illustrating the relative coaction of the wedge plate.

FIGURE 22 is a fragmentary elevational view taken at line 22—22 of FIGURE 21, with end-plates removed.

FIGURE 23 is a fragmentary view taken along line 23—23 of FIGURE 22.

FIGURE 24 is a force diagram of the moments which come into play in the illustration in FIGURE 19.

Referring to FIGURES 1 to 13 inclusive, which show a preferred embodiment of the invention, container 10 is formed with a base platform or pallet portion 12. Two opposite ends 14 of platform 12, such for example as the front and rear ends thereof, are provided with recesses 16 in which are mounted retaining means or hooks 18 adapted to receive and hold strap stirrups or rings 20 described more fully hereinafter. FIGURE 13-A indicates in detail a preferred form of hook 18 which comprises a flat or plate portion 22 having openings through which bolts 24 attach it to platform 12. The front part of hook 18 is formed with an inverted, generally U-shaped section comprising two downwardly extending vertical walls 25 between which a ring or stirrup 20 is received and held.

Figure 1:
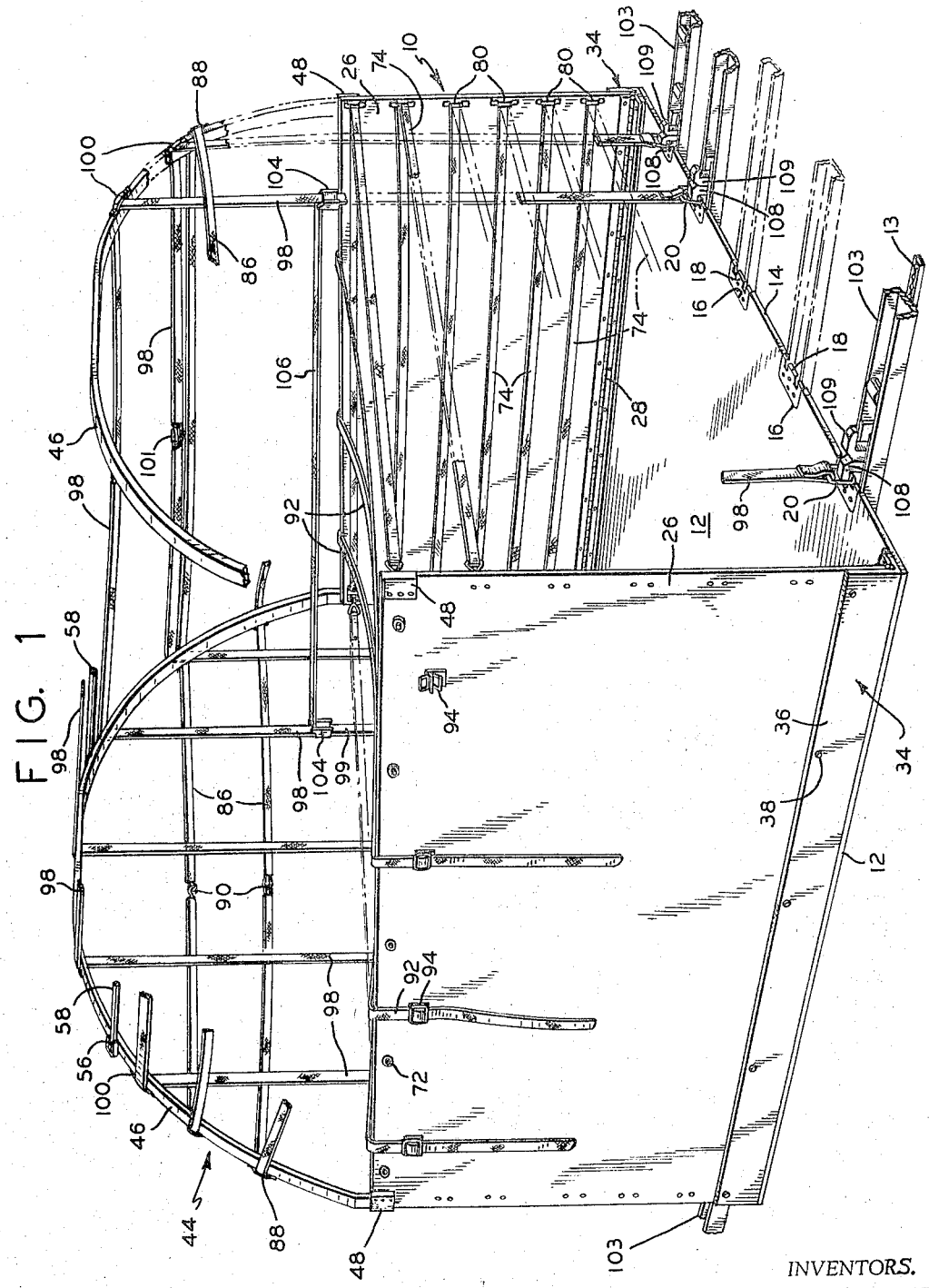
FIGURE 1 is a perspective view of a preferred form of collapsible cargo container embodying the invention with cover removed.

Container 10 also has two laterally spaced side walls 26 extending along the full length of platform 12. Each wall 26 is suitably secured, as by screws to one leaf of an elongated hinge 28, the other leaf of hinge 28 is suitably attached to elongated bar 30, which in turn is rigidly secured to the short leg 32 of angle member 34, the latter extending along the entire length of platform 12 as shown in FIGURE 1. Angle member 34 is attached in any suitable conventional manner to platform 12. The vertical leg 36 of angle member 34 is provided with a plurality of longitudinally spaced captive screws or bolts 38, the threaded portions of which can be turned home in suitable threaded members, such as nuts 40 supported in walls 26.

As illustrated in FIGURES 1, 2, 3 and 4, the outer face of leg 36 of angle member 34 lies in the same plane as a face of side edge 42 of platform 12. It will be appreciated that when screws 38 are turned out of their threaded engagement with nuts 40, side walls 26 are free to be moved in the direction shown by arrow A in FIGURE 4 from the full line position to the broken line position such that platform 12 and side walls 26 can form a compact folded unit, as illustrated in FIGURE 3, for ready transportation of an empty container back to its point of origin or to any other desired location for further use. This construction makes it possible to stack a plurality of collapsed containers 10, each with its own hardware and coacting parts for transportation to any selected loading location, or for storage.

Prior to the folding operation just described, it is necessary to remove the upper structure of the container which is designated generally 44. Referring particularly to FIGURES 1, 2 and 5-8 inclusive, upper structure 44 comprises two bow or arcuately shaped or other suitably shaped frame members 46. Preferably frame members 46 are formed from a suitable light metal such as aluminum or magnesium or alloy, or they can be formed from wood or plastic if desired. As illustrated herein, it is preferred that they be formed from aluminum. Each frame member 46 is a single member extending from a suitable supporting bracket 48 on one wall 26 to a complementary, or similar bracket 48 on the other wall 26. In the illustrated embodiment each frame member 46 (see FIGURES 6 and 7) is formed from a rectangular cross section aluminum extrusion of suitable dimension. Its end portions at the point where it is supported in a bracket 48 are modified to provide a lip 50 which slides into opening 52, or the space provided by the mounting of bracket 48 on a side wall 26. The plane of tongue 50 is at right angles to faces 54 of frame member 46, as shown in FIGURE 6, so that when tongues 50 are pushed home in openings 52, faces 54 rest snugly on the top edge 27 of walls 26. This arrangement not only provides a satisfactory means of assembling frames 46 in operative relationship with side walls 26 but also provides a means for stabilizing frame members 46 against unwanted movement or inadvertent separation relative to side walls 26.

Figure 11:
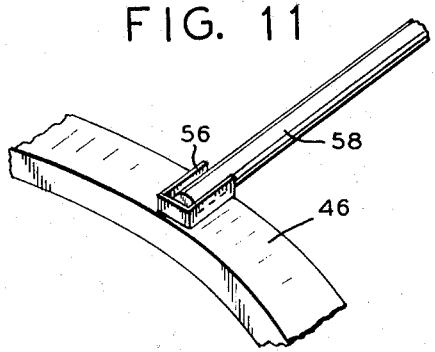
FIGURE 11 is a perspective view of a fragment of the top frame showing the cross-bar detail.

Referring to FIGURES 2, and 11, each frame member 46 is provided with a plurality of sockets 56 attached to the outer upper surfaces thereof in any suitable manner, as by riveting. Sockets 56 are arranged preferably in equidistantly spaced relationship along the length of frame members 46 and in opposed relationship such that the free ends of stiffening bars or rods 58 extending between frame members 46 can be seated therein and supported thereby when a container is erected for loading.

A removable cover 60 preferably formed from a suitable flexible material such as canvas, rubber treated fabric or other tough water resistant material is detachably secured to frame members 46. Cover 60 protects cargo in container 10 from damage from the elements i.e., rain, dust, etc. As shown in FIGURE 2, cover 60 is stretched over bars 58 and has its ends detachably secured to frame members 46 and the tops of walls 26. One satisfactory method of effecting the attachment of cover 60 to frame members 46 is by providing the latter with headed fittings 62 preferably secured in the top wall of a frame member 46 (FIGURES 7 and 8). Fittings 62 are mounted in suitable number and spacing along the top walls of frame members 46 such as to insure a tight fitting of cover 60 over upper structure 44.

Referring to FIGURE 7, it will be seen that the edges of cover 60 are provided with a tubular roll 61 in which is located an elongated flexible thong or lacing such as leather or tough plastic 64. The portion of cover 60 adjacent to each fitting 62 is cut out, as at 66 thereby exposing a length of thong 64 which seats beneath heads 68 of fittings 62. In attaching cover 60 to upper structure 44, thong portions 65 adjacent cut-out portions 66 are progressively hooked beneath heads 68 as the cover is rolled upwardly over the frame members 46.

The ends of cover 60 adjacent the tops of walls 26 are provided with a conventional type of spring snap grommets 70 which coact with complementary fastening means 72 mounted in spaced relationship on walls 26.

The ends of cover 60 are detachably secured to walls 26 merely by pressing grommets 70 against their corresponding fastening means on walls 26.

When a container 10 is being prepared to hold cargo, sides 26 are swung up from the collapsed storing or shipping positions shown in FIGURE 3, to their upright operative positions shown in FIGURES 1 and 2. Bolts 38 are turned home in nuts 40 in walls 26 and the latter are thereby secured against collapse. Upper structure 44 is then assembled in proper relationship relative to walls 26. This is effected by sliding tongues 50 of frame members 46 into openings 52 and seating surfaces 54 of members 46 against faces 27 of walls 26. The ends of cross rods or bars 58 are seated in sockets 56 which preferably are so designed as to provide a snug pressure fit which tends to maintain the ends of rods 58 against slipping out of their respective sockets 56.

Cargo resting on platform 12 and between side walls 26 of container 12 is restrained against sliding out during handling and shipment by means of a plurality of substantially horizontally disposed vertically spaced straps 74. These straps preferably are formed from a woven nylon material, and have great strength and durability. Straps 74, however, serve more as holding or retaining means and are not usually subjected to or caused to support great forces. Any suitable number of horizontal straps 74 can be provided. As illustrated herein in FIGURE 1, six horizontal straps 74 are provided. In FIGURE 2, three straps are shown. The number may be varied, as desired. These straps can be provided for only the open sides of a container 10, or, if desired, and as shown in FIGURES 1, 2 and 10, they may be mounted so as to extend along all four sides thereof. The provision of straps 74 along the inner faces of walls 26, provides a possible means for preventing breakage of cargo through a wall 26, as well as preventing damage to the goods.

As illustrated in FIGURE 10, there are two straps 74 constituting a single horizontal strap assembly. One end of one strap 74 is secured to a pin 76 supported in bracket 78 attached to one end of one side wall 26. This strap extends along this wall 26 and through an eye 80 attached to wall 26 adjacent its other end. From eye 80 strap 74 turns at right angles to wall 26 and extends across one open end of container 10 to a point of attachment of its free end to a removable member 82 forming a part of securing fitting 84 attached to the other end wall 26 at a point spaced diagonally from bracket 78. The other strap 74 of this horizontal assembly is mounted in the same manner. It has one end attached to a bracket 78 adjacent the first named fitting 84. Its free end is detachably secured to a second securing fitting 84 mounted adjacent the first named bracket 78. Any conventional type of securing fitting can be used for detachably attaching the free ends of straps 74 in their operative positions. I have found that fittings made by Brownline, El Segundo, California, and designated WB10730-3 and WB20050 give satisfactory results. All other horizontal strap assemblies attached to walls 26 are constructed and mounted in the same manner. It is considered, therefore, that the above detailed description of one should suffice to a complete understanding of the mechanism involved.

Figure 12:
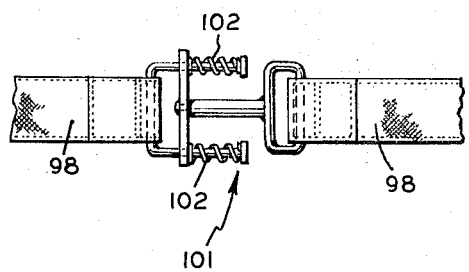
FIGURE 12 is a view of a strap expanding detail.

Since cargo can be loaded into a container 10 to a height corresponding to the top of frame structure 44, one or more auxiliary horizontal straps 86 are also provided for holding such cargo in position therein. Referring to FIGURES 1 and 2 it will be seen that straps 86 extend through eyes 88 formed of metal or plastic suitably attached to frame members 46. Their ends are fastened together by a simple conventional hook to ring connection 90. The natural resiliency of straps 86 which preferably are made of woven nylon insures that their ends will remain hooked together when straps 86 are in use. If desired suitable conventional devices such as shown in FIGURE 12 and described hereinbelow may be used.

Referring to FIGURES 1 and 2 it will be seen that there are provided a plurality of straps 92, preferably made of woven nylon, which are strong and yet resilient. Straps 92 extend across container 10 from one side wall 26 to the other and function to hold cargo down upon base platform 12. The free ends of each strap 92 passes over the top of each side wall 26 of container 10, and each is detachably secured in a suitable conventional type of releasable clamp buckle 94 such as shown in FIGURE 1. When cargo has been loaded into container 10, straps 92 are disposed over the top of the load and then their ends are secured in clamp buckles 94 attached to the exterior of side walls 26. Straps 92 are so tightened as to allow them to follow the contours of the upper surface of the load, and rest snugly thereagainst, for a reason to be explained more fully hereinafter. Instead of straps 92, a net 96, such as shown in FIGURES 14 and 16 may be used with equally satisfactory results.

As described hereinabove, the invention makes it possible to insure that loads can be carried and restrained against appreciable movement under the most severe conditions of travel up to and including crash conditions involving forces equal to at least nine (9) g's. Because of the shape, design and construction of container 10 embodying the invention and the holding and fastening means coacting therewith, it is possible to secure properly cargo contained therein whether it is fully or only partly loaded, and thereby achieve these novel desired results.

Referring to FIGURES 1, 2 5, 7 and 13, it will be seen that a plurality of relatively wide vertical straps 98, preferably of woven nylon, "Dacron" or other suitable material capable of withstanding breakage against great forces, extend from a point adjacent the front edge of platform 12 upwardly and pass through eyes 100 formed from flat metal or plastic strips suitably attached to front frame members 46. Straps 98 then stretch across the top of container 10 and pass through similar aligned eyes 100 on the rear frame member 46, and then downwardly to a point adjacent the rear edge of platform 12. Each strap 98 preferably is formed with a centrally located conventional type of resilient member 101 (see FIGURE 12). Member 101 includes springs 102 which maintain a firm resilient connection of the two halves of straps 98 at all times. Members 101 also provide a resilient tensioning of stirrups 20 attached to the free ends of straps 98 when they are in engagement with hooks 18. In the illustrated embodiment, five (5) straps 98 are shown. Obviously, a different number could be used if desired. The number shown is used in order to conform with the container locking requirements of a particular aircraft illustration.

Traveling on each of the vertical sections of straps 98 is a locking buckle 104. These buckles are free to slide in a vertically down direction on the application of a minimum force which is applied when a load of cargo is being "tied-down" or about to be loaded into a carrier, such as an aircraft. Upward movement of a buckle 104 on its respective strap can only be effected by a buckle release.

Each buckle 104 is connected to one end of a clamping or cargo restraining strap 106 which extends fore and aft within container 10 between its respective straps 98 and buckles 104. Due to the novel coaction between straps 106, buckles 104 and the portions 99 of straps 98 beneath buckles 104 and secured by locking dogs 108 of a hold down apparatus referred to hereinbelow, not only is the cargo in container 10, but also container 10 itself held properly against movement even under the most severe conditions mentioned heretofore.

A suitable type of buckle 104 is that shown in FIGURES 19–23. This buckle comprises two side plates 110 having shoulders 112 beneath which front and rear walls 114 are seated. The inner faces 116 of walls 114 are tapered and spaced from each other a distance sufficient to enable a split wedge member 118–119 to be mounted therein for movement up and down in the wedge shaped space. Spring 120 having one end bearing against inturned parts of walls 114 (FIGURES 20 and 21) and their other ends pressing against the tops of split wedge member 118–119 bias split wedge members 118–119 into gripping relationship with a strap 98 passing therebetween. Plates 110 and walls 114 are secured together by screws 122 and bolt 124. This bolt has an exposed center portion 125 extending between lugs 129 formed on plates 110 which serves as an anchor for one end of a strap 106. All straps 106 are similarly connected to their respective buckles 104. The construction of buckle 104 is such that it can be moved quite readily downwardly along a strap 98 into its effective cargo restraining position. However, once disposed in this locking position, it cannot move or be moved upwardly along strap 98 due to the friction on strap 98 caused by the wedging action of split wedge members 118–119 and the inner faces 116 of walls 114. In order to effect a release one wall 114 is provided with an elongated slot 126 through which projects a pin 128 mounted in split wedge member 119. When pin 128 is lifted (as viewed in FIGURE 20), against the pressure of springs 120, to the position shown in FIGURE 21, the locking frictional engagement of strap 98 is broken, and while pin 128 remains raised, buckle 104 can be moved upwardly along its respective strap 98.

The method of restraining cargo in container 10 and the operation of the mechanism comprises disposing the desired cargo on platform 12. The front and rear horizontal straps 74 and 86 are positioned behind straps 98 up to the level of cargo actually loaded in container 10 in order that loads imposed upon these straps can be transferred to straps 98 to the load or cargo restraining portions 99 of straps 98. Any strap 74 or 86 which are not required for a given load can be suitably connected together exteriorly of straps 98 after buckles 104 have been positioned in their cargo restraining positions. Next, straps 92 are drawn loosely over the top of the load between side walls 26, and are disposed beneath straps 106. Rings 20 on straps 98 are positioned over retaining means on hooks 18 on platform 12 and buckles 104 are moved downwardly along straps 98 until straps 106 are tightly secured over the top and downwardly over at least a part of the upper sides of the cargo load, as illustrated in FIGURES 2 and 13. The extent to which straps 106 are disposed along the upper sides of the cargo load depends largely upon the shape of the load. Suffice it to say that the conjoint operation of strap portions 99 and straps 106 insures an extremely strong tie-down of the cargo on platform 12. The force diagram of straps 98, and 106 and strap portion 99 is as shown in FIGURE 24. It will be apparent that the portion of strap 98 above buckle 104 takes little of any forces which may be applied by the cargo. They do, however, maintain the proper positioning of straps 98 and strap portions 99.

Whether or not cover 60 is fixed in position on container 10 depends upon the wishes of the transporting company, the shipper and weather conditions. If it is used, it is attached to frame members or hoops 46, as described above.

Loaded containers 10 are delivered into a carrier for transportation. In the illustrated embodiment, the carrier is assumed to be an aircraft (not shown). The container 10, however, is shaped to conform with the cross section of the aircraft in which it is to be transported.

Referring to FIGURES 1, 2, and 13 in the embodiment of the invention selected for illustration, the floor of the aircraft is provided with cargo handling mechanism of the type disclosed and described in the above referred to copending Davidson application, Serial No. 296,177, although containers constructed in accordance with the invention can find ready use with other cargo handling apparatus. Dogs 108 and 109 are adapted to be located beneath the upper run of roller tray conveyors 130 which preferably are detachably secured to conventional seat rails 13 mounted on the floor of the aircraft (not shown). When a loaded container 10 is positioned, as shown in FIGURE 1, in the aircraft, dogs 108 and 109 are moved into the operative position shown. Dogs 108 extend through rings 20 and above hooks 18 on platform 12. Thus the forces exerted during transportation are taken by strap portions 99 and straps 106 and not by platform 12. In this way cargo loads are restrained against movement in a markedly improved manner, and maximum preshaped loading results because of the construction of container 10.

In like manner, dogs 109 engage the front rings 20 of the next loaded container 10 moved into adjacency with that shown in FIGURE 1 and secure the loaded cargo rigidly to the floor of the aircraft as described in the copending Davidson application, Serial No. 296,177.

FIGURE 14 illustrates a modified form of the invention in which container 132 can be termed a substantially rigid structure. It is provided with a base platform 134 to which are secured side walls 136 extending upwardly in an arcuate formation from one side of platform 134 to the other. Side walls 136 and arcuate portion 138 can be formed of relatively thin sheet metal such as steel, or aluminum, or other suitable material such as sheet plastic having sufficient strength i.e., fiber glass. Side walls 136 are reinforced by base boards 140 extending along the sides of platform 134 and suitably secured thereto and cross stiffening members 142, and an upper wall stiffening member 144. As shown in FIGURES 14 and 15, tubular reinforcing and framing members 146 similar to frame members 46, having their ends secured to platform 134 form the outer framing of container 132 to which the outer edges of side walls 136 and top 138 are suitably attached as by screws (not shown). As in the case of container 10, the cross-sectional shape of container 132 closely approximates that of the carrier in which it is to be transported.

Platform 134 is provided with recesses 148 in which are mounted stirrup or ring retaining means or hooks 150 adapted to receive and hold rings or stirrups 152 secured to the ends of straps 158, described more hereinafter. The construction and function of platform 134, recesses 148 and retaining means or hooks 150 are the same as platform 12, recesses 16 and 18 disclosed in FIGURES 1, 2 and 13, and fully described hereinabove.

Referring again to FIGURE 14, it will be seen that a load of cargo designated C in container 132 is partially covered by net 96 having its ends fastened by hooks 154 to the interior of side walls 136. Net 96 extends relatively loosely over the top of the cargo C. However, crossing or extending over net 96 and cargo C located therebeneath are transverse straps 156 having their free ends secured to pins 125, as in the case of the attachment of the free ends of straps 106 to pins 125 of locking buckles 104, described in detail hereinabove. Each buckle 104 is mounted for vertical sliding movement on a strap 158 which has its upper end attached by a suitable type of conventional hook 160 to an eye 162 frangibly secured in the outer face of frame member 146 of container 132. When it is desired to secure cargo C firmly to platform 134 against movement during transportation or shipment, as by means of an aircraft, a stirrup or ring 152 is placed in holding relationship with its corresponding retaining means 152, and buckle 104 is moved downwardly along its supporting strap 158 until the desired tight securing relationship between strap 156 and lower portion 159 of strap 158 is obtained. The distribution of forces in the set of straps 156, 158 and portion 159 is the same as that disclosed in FIGURE 24 with respect to straps 89, 106 and strap portion 99. It should be noted that since top 138 is substantially more rigid than in the case of upper structure 44, straps 158 are attached so as to break away whenever a given load is exceeded. However, the cargo is still restrained because of the coaction of straps 156 and portions 159 of strap 158.

As shown in FIGURE 14, five vertical straps 158 are provided. Obviously, more or less could be used depending upon the requirements of a particular vehicle in which cargo is to be transported.

It is assumed, for purposes of illustration, that container 132 disclosed in FIGURE 14 is secured for transportation in an aircraft (not shown) which is provided with seat rails 131 and roller tray conveyors having locking dogs 108, 109 which engage stirrups or rings 152 and function in the manner described hereinabove when a loaded container is positioned in the aircraft and dogs 108 and 109 are moved into operative relationship with rings 152.

FIGURE 16 illustrates another modified form of container embodying the invention. This container, designated generally 164, is substantially the same in construction as container 132 shown in FIGURE 14. However, container 161 is designated to hold refrigerated cargo, and its side walls 166, top connecting section 168 and end closures 167 are insulated. A typical wall and top section construction comprises an insulating sheathing 169 such as laminated sheet metal 170 and fiber glass or other insulating material 172, or lamination of plywood with fiber glass, etc. located therebetween.

Container 164 is provided with the same end framing 173, as 146 shown in FIGURE 14. Laminated sheathing 169 is attached to framing 173 as by screws (not shown) or in any other suitable known manner. A refrigerator unit 174, of suitable conventional design, is mounted within container 164. Although unit 174 can be located at any desired position in container 164, it is found that when it is mounted on the underside of sheathing 169 and preferably centrally of top section 168 satisfactory results are obtained. Unit 174 is powered from any suitable source by cables 176, or under suitable conditions may be packed with Dry Ice. End closures 167 preferably are formed from flexible laminated insulating material and are attached by conventional type grommets 178. End closures 167 may consist of laminations of plastic and insulating fibre i.e., polyethylene and Fiberglas, respectively, or other suitable type of insulating material. Also, if desired, end closures could take the form of rigid shaped closure members similar in make-up to side walls 169, or be suitably sectioned for ease in handling.

As disclosed in FIGURE 16, end closures 167 are provided with recesses 180 along their bottom edges at spaced intervals corresponding to the positions of locking dogs 108 and 109 which extend therethrough into rings 152 for securing container 164 to the floor of the aircraft, in the same way as shown and described in the above referred to Davidson application.

Horizontal straps 74 and the means by which they are secured and used are the same as in the structure shown in FIGURES 1 and 14, described hereinabove as are straps 86. The same obtains concerning straps 156, net 96 and straps 158, and their attachment to the side walls of their respective containers, and attachment of the upper ends of straps 158 to framing 173 and the coaction between the lower portions of straps 158 and buckles 104. The temperature in container 164 can be maintained, as desired, by conventional control means (not shown).

The modified form of the invention shown in FIGURES 17 and 18 comprises a container 182 having vertically extending end walls 184 and open sides 186 through which cargo can be loaded. This container is provided with a plurality of horizontal straps 188 corresponding in mounting and function to straps 74 in FIGURES 1, 2 and 14. A plurality of transverse straps 190 having rings 192 hooked over lugs 194 mounted in recesses 196 in platform 198 of container 182 extend over the cargo, as shown in FIGURE 17 and have their other ends secured in the same manner as the opposite side of platform 198. Suitable conventional type of buckle take-up means (not shown) can be used to adjust the length of straps in accordance with the arrangement of the cargo in container 182. In use straps 190 perform the same functions as straps 92, the net 96 described hereinabove. The actual restraint of cargo in container 182 is effected by straps 200, the ends of which are attached to top frame members 202 (FIGURES 17 and 18) in a manner similar to the attachment of straps 98. The distribution of forces in the set of straps 206, 200 and portion 201 is the same as that disclosed in FIGURE 24.

What is claimed is:

1. A cargo container comprising a floor, side walls attached to opposite sides of said floor, and longitudinally spaced frame members shaped to conform with the contour of the roof of a carrier carried by said side walls, a plurality of straps located in spaced relationship along said frame members depending therefrom into proximity with said floor of said container, means on the free end of each of said straps for securing said free ends of said straps to said floor of said container, and adjustable locking buckle mounted on each of said depending straps, cargo load straps extending across the top of cargo in said container, each of said load straps having its ends passing through corresponding pairs of said buckles at the front and rear of said container, and locking means in said buckles for securing said cross straps against loosening when said straps are tightened against the top of said cargo in said container.

2. The cargo container defined in claim 1 including a plurality of spaced longitudinal straps extending from one side wall to the other, above cargo resting on said floor, and means for securing the ends of said longitudinal straps in holding relationship with said cargo.

3. The cargo container defined in claim 1 including a cargo hold down net disposed above cargo resting on said floor of said container and beneath said cargo load straps, and means for securing said net to the side walls of said container.

4. The cargo container defined in claim 1, including means hinging said side walls to the opposite sides of said floor of said container, and means for securing said side walls in erected vertical arrangement for loading of cargo on said floor between said side walls.

5. The invention defined in claim 4, including means for detachably mounting the ends of each of said frame members in said side walls, said means comprising brackets carried by said side walls and means on the ends of said frame members detachably seating on said brackets.

6. A cargo container comprising a floor, a pair of spaced side walls extending upwardly from opposite sides of said floor, a roof connecting the tops of said side walls to form a generally U-shaped cargo carrying unit, cargo restraining straps depending from longitudinally spaced portions of said roof into proximity with said floor, a holding device carried on the free end of each of said straps, means for attaching said holding devices to said floor, a plurality of complementary straps disposed over said cargo on said floor, and means coupling the free ends of said complementary straps to longitudinally spaced complementary depending straps at the front and rear of said unit, said means comprising locking buckles operative in response to the tensioning of said complementary straps to cause the lower portions of said depending straps to coact with said complementary straps to restrain said cargo against movement in said container.

7. The container defined in claim 6, including cargo confining means extending from side wall to side wall over cargo in said container, and disposed beneath said complementary straps, a series of vertically spaced straps extending across said front and rear of said unit, beneath the tensioned lower portions of said vertical straps, and means securing the ends of said straps to said side walls of said unit.

8. The invention defined in claim 6 comprising in combination a carrier for said unit, and wherein the floor of said carrier is provided with locking means coacting with said holding devices on said depending straps whereby forces on said straps are transmitted directly to the floor of said carrier.

9. The invention defined in claim 6 including cover means for said frame member, and means detachably securing said cover means to said roof of said unit.

10. A cargo container comprising a floor, walls extending upwardly from at least two opposite sides of said floor and a roof shaped to conform to the contour of the roof of the carrier in which said container is to be transported, longitudinally spaced securing means depending from opposite sides of said roof of said container to positions adjacent said floor, securing devices carried by said securing means for attachment to the floor of said carrier, adjustable locking units carried by each of said securing means, cargo load hold down members extending across the top of cargo resting on the floor of said container connected to said locking units and locking means for securing each of said locking units in a predetermined cargo restraining position relative to said securing means and members when said units are positioned thereon with said members in tensioned cargo restraining relationship with said securing means.

11. The invention defined in claim 8 wherein said locking means in said carrier comprise locking dogs constructed and arranged to engage said holding devices and thereby restrain said container against movement in said carrier.

References Cited by the Examiner

UNITED STATES PATENTS

| | | | |
|---|---|---|---|
| 2,605,064 | 7/1952 | Davis | 105—369 X |
| 2,633,714 | 4/1953 | Wehby | 105—376 X |
| 2,705,461 | 4/1955 | Campbell | 105—369 |
| 3,173,539 | 3/1965 | Looker | 105—369 X |
| 3,204,581 | 9/1965 | Davidson | 105—369 |

ARTHUR L. LA POINT, *Primary Examiner.*

DRAYTONE E. HOFFMAN, *Examiner.*